W. S. THOMSON.
GAS PLIERS.
APPLICATION FILED NOV. 1, 1913.

1,216,886.

Patented Feb. 20, 1917.

Witnesses:
R. W. Edwards.
H. C. Kingsley.

Inventor:
William S. Thomson.
By Louis M. Schmidt
Atty.

UNITED STATES PATENT OFFICE.

WILLIAM S. THOMSON, OF PLANTSVILLE, CONNECTICUT, ASSIGNOR TO THE H. D. SMITH & COMPANY, OF PLANTSVILLE, CONNECTICUT.

GAS-PLIERS.

1,216,886.  Specification of Letters Patent.  Patented Feb. 20, 1917.

Application filed November 1, 1913. Serial No. 798,665.

*To all whom it may concern:*

Be it known that I, WILLIAM S. THOMSON, a citizen of the United States, residing at Plantsville, in the county of Hartford and State of Connecticut, have invented certain new and useful Improvements in Gas-Pliers, of which the following is a specification.

My invention relates to improvements in gas pliers, and the object of my improvement is to produce a pair of pliers suitable for operating on gas pipes having means for shifting the pivotal connection so as to change the spread of the jaws and which is provided with jaws that are off-set relatively to the handle portions.

In the accompanying drawing:—

Figure 1:
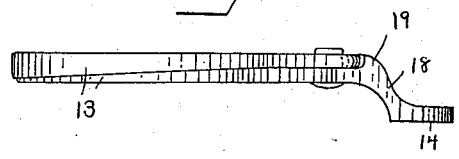
Figure 1 is a side elevation of a pair of gas pliers embodying my invention.
Figure 2:
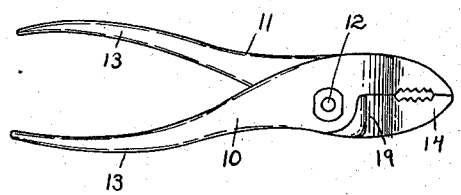
Fig. 2 is a plan view of the same.

My improved gas pliers comprise an upper member 10 and a lower member 11 pivotally connected adjacent the middle portions by a pivotal pin 12, and having handles 13 at one end and jaws 14 at the other end.

The pivotal pin 12 has a square body that is a fit for a square hole 15 in the upper member 10. The lower member 11 has two circular holes 16 of such diameter as to permit the pin 12 to rotate therein and which are separated by an appreciable distance corresponding to the amount of shift in the pivotal connection of the members 10 and 11 that is desired, and which are cross-connected by a slot 17 that is a sliding fit for the square body portion of the pivotal pin 12. The construction and arrangement of the pivotal pin 12 and the square hole 15 in the one member and the circular holes 16 and slot 17 in the other member are such as to permit shifting the point of pivotal connection of the members so as to change the amount of spread of the members in a manner that is well known and ordinary.

Intermediate the jaws 14 and the pivotal connection the members 10 and 11 are provided with shanks 18 which are so formed as to position the jaws 14 in off-set relation to the handles 13.

Figure 3:
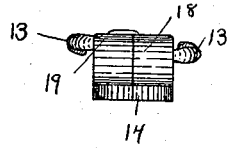
Fig. 3 is an end elevation of the same.
Figure 4:
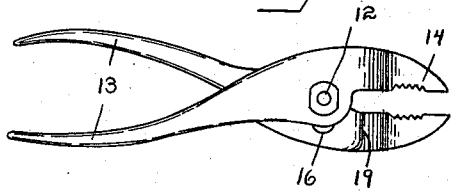
Fig. 4 is a plan view of the same with the point of pivotal connection of the members shifted from that shown in Fig. 2.
Figure 5:
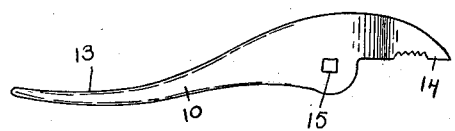
Fig. 5 is a plan view of the upper member.
Figure 6:
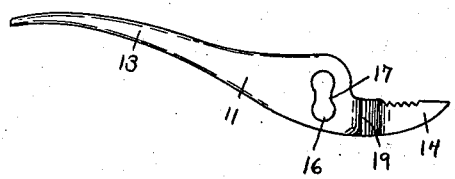
Fig. 6 is a similar view of the lower member.
Figure 7:
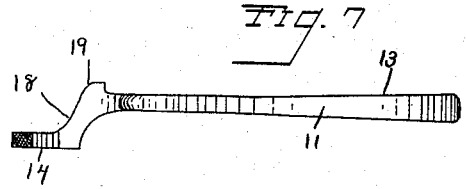
Fig. 7 is a rear elevation of the said lower member.

The formation of the shanks 18 and the relation of the jaws 14 thereto are preferably such that the jaws 14 will meet in the same plane, as shown in Fig. 3, and which plane is parallel with the plane of movement of the handles 13.

A protuberance in the form of a filling lug 19 is provided on the lower member 11 on the upper end of the shank 18 to compensate for the drop of the lower member 11 relatively to the upper member 10 due to the overlapping of these members at the pivotal point so that in end elevation as shown in Fig. 3 the shanks 18 of the said two members 10 and 11 will be similar.

The off-set arrangement of the jaws relatively to the handles described permits of operating the jaws in an effective manner in positions that would not be possible otherwise.

It will be noted that the members 10 and 11 that compose my gas pliers comprise each a body portion at the position of the pivotal pin 12, or where the two members are overlapping one another, and which have plane faces in abutment, and outwardly from the said body portions on the handle side there is the handle proper 13, each of which swells outwardly in depth gradually from the said body portion to the extreme outer end, where they are appreciably enlarged, and the increase in depth is all on the inner face, so that the two handles at the said extreme ends meet substantially in the same plane, and which plane corresponds to that of the abutting faces of the body portions.

On the side remote from the pivotal connection there are the jaws 14 at the extreme end and the shanks 18 connecting the jaws 14 with the body portions.

In the case of the upper member 10 of the overlapping members the shank 18 is formed by a simple off-set bend of the material of which the said member is formed.

In the case of the lower member 11 it will be noted that the shank 18 is precisely like that of the upper member 10 notwithstanding the fact that the body portion thereof is below that of the other member 10. This result is obtained by providing the protuberance 19, as mentioned, on the lower member 11, at the junction of the shank 18 and the body portion of the lower member 11. The said protuberance 19 is furthermore shaped and positioned to serve as a stop for limiting the degree of opening of the members 10 and 11.

That is to say, the body portions and the handle portions of the members 10 and 11 are simple overlapping members, and that by providing the protuberance 19 on the lowermost of the two members the jaw portions and the shank portions of the said members are precisely similar the one to the other.

Furthermore, the shanks 18 are disposed at an abrupt angle to the body portions and the jaws, as described, and the protuberance is an upward extension of what constitutes the shank proper of the lower member 11, and which is the portion directly connecting the body portion of the same with the jaw 14.

The angle between the shank in each case and the body portion at one end and the jaw at the other end, while abrupt as stated, is slightly obtuse or greater than a right angle, the shank being at an inclination to the parts to which it is connected. This condition permits these parts to be formed by the drop forging process. The overlapping body portions and the handles, and also the protuberance or filling lug 19, are all of proper shape to permit of being made by the said process. Accordingly, the entire contour of the two mating members is such as to permit them to be formed by the drop forging process, involving the use of dies of ordinary character, which feature is of considerable importance from a production standpoint.

I claim as my invention:—

A pair of pliers composed of a pair of pivotally connected members, the said members comprising each a handle at one end, a flattened and enlarged body portion connected to one end of the said handle, a shank portion extending downwardly and slightly outwardly from the said body portion, and a jaw extending outwardly from the outer end of the said shank portion, the said body portions being superimposed one on the other, and pivotally connected, the opposed edges of the said shanks being adapted to meet along the medial plane when the members are in the closed position, and the lower of the said members having a shank extension in the form of a protuberance on the upper side for building up the shank portion of the said lower member to correspond substantially in size and form with the shank portion of the upper of the said members.

WILLIAM S. THOMSON.

Witnesses:
G. R. BOND,
E. H. GALPIN.

Copies of this patent may be obtained for five cents each, by addressing the "Commissioner of Patents, Washington, D. C."